United States Patent

Byers

[11] Patent Number: 5,987,586
[45] Date of Patent: Nov. 16, 1999

[54] METHOD AND APPARATUS FOR ASYNCHRONOUS DEVICE COMMUNICATION

[75] Inventor: Larry L. Byers, Apple Valley, Minn.

[73] Assignee: Unisys Corporation, Blue Bell, Pa.

[21] Appl. No.: 08/173,408

[22] Filed: Dec. 23, 1993

[51] Int. Cl.⁶ .................................................. G06F 13/00
[52] U.S. Cl. .......................... 712/11; 709/234; 710/130; 710/131
[58] Field of Search .................................... 395/800, 775, 395/725, 425, 275, 200, 250; 367/117, 135, 137; 370/53, 61, 91, 463, 357, 428; 371/11.2, 8.2, 21.1, 68.1, 68.2, 68.3; 714/820, 821; 712/11; 769/248, 250, 234; 710/129, 130, 131; 369/176

[56] References Cited

U.S. PATENT DOCUMENTS

| | | | |
|---|---|---|---|
| 4,556,974 | 12/1985 | Kozlik | 370/89 |
| 4,996,688 | 2/1991 | Byers et al. | 371/16.5 |
| 5,140,685 | 8/1992 | Sipple et al. | 395/425 |
| 5,157,781 | 10/1992 | Harwood et al. | 395/575 |
| 5,299,313 | 3/1994 | Petersen et al. | 395/200 |

*Primary Examiner*—Larry D. Donaghue
*Attorney, Agent, or Firm*—Charles A. Johnson; Mark T. Starr; Nawrocki, Rooney & Sivertson, P.A.

[57] ABSTRACT

An apparatus for and method of providing rapid communication between separately clocked system elements. A network interface module is used as the overall system control and communication interface to each of the separate system elements. Each of these system elements is controlled by a different and dedicated programmable micro-engine. A separate register located within and addressable by each of the micro-engines provides the basic data transfer path. Access by a micro-engine to the corresponding register is easily accomplished by firmware. The bit serial scan interface between the network interface module and each of the registers is controlled by the network interface module.

11 Claims, 12 Drawing Sheets

METHOD AND APPARATUS FOR ASYNCHRONOUS DEVICE COMMUNICATION

CROSS REFERENCE TO CO-PENDING APPLICATIONS

None.

BACKGROUND OF THE INVENTION

1. Field of the Invention

The present invention generally relates to digital data processing systems and more particularly relates to large scale digital data processing systems having multiple, asynchronously clocked processing components.

2. Background of the Invention

It is well known to design digital data processing systems using a number of separate processing components. As the required computational capacity increases, it is easier to meet the need with a number of separate components using a parallel processing architecture rather than attempt to provide a single large capacity device. The limit of this approach is determined by the degree to which a processing task may be accomplished by the separate processing components operating in parallel.

Given that a system has been implemented using a number of separate processing entities, the necessity to communicate amongst them arises. A simple form of such communication is via the input/output capability of a processor. Using this approach, each processor appears as a peripheral device to each of the other processors to which it is interconnected. Various early real time systems, such as the Naval Tactical Data System (i.e. NTDS) utilized this technique. Today, many intra-office personal computers are coupled in this fashion in a network.

The major advantage of this input/output approach is the ease and simplicity by which it is implemented. However, this interface technique is inherently slow. Though the bandpass tends to be sufficient for processor to peripheral communication, because of the limited internal speed of most peripheral devices, this method is very slow when compared to internal processor speeds. The technique is further limited by its software control, which makes it unsuitable for a number of maintenance and control tasks requiring a more complete control of the hardware.

An approach having substantial promise involves scan/set communication. In the earliest form, this provided multi-processor systems with the capability for a processor to read/modify/write to a shared memory location. Most often, individual memory bits were defined as control flags permitting multiple, asynchronous processors to share various tasks and resources. Scanning and controlling flags in this manner substantially speeds the intercommunication amongst processors. However, because this use of the scan/set approach is software oriented, it possesses the same disadvantages with regard to maintenance and control tasks as with other software approaches.

A significant contribution to the use of scan/set intercommunication is found in U.S. Pat. No. 4,996,688, issued to Byers, et al. In this reference, a separate scan\set interface is established among the microcontrollers which provide the control logic for the various components within a system. Thus, status and control information is readily transferred amongst system components. This communication occurs under firmware control. Therefore, it is inherently faster than similar transfers under software control. Furthermore, because the transfers are at the level of the basic logic control, hardware control and status information can be exchanged, particularly for maintenance purposes.

Though the Byers et al. approach to scan/set communication is rapid, the total bandpass is very limited, because only discrete command and status signals are transferred. There is no provision of the interface for sending and receiving larger data sets.

SUMMARY OF THE INVENTION

The present invention overcomes the disadvantages found in the prior art by providing a direct bi-directional data interface among the micro-engines, which serve as the hardware controllers of the various components within the system. In this context, a micro-engine is a specialized controller incorporating customized random logic within a basic micro-code processor. The direct bi-directional data interface may transfer command and status discrete signals, as with scan/set interfaces, or may transfer complete data words and even data arrays.

In accordance with the preferred mode of the present invention, a separate, stand-alone component, called a Network Interface Module (i.e. NIM) provides the normal system level control of the major system components. The NIM contains the needed circuitry to transfer data words between itself and each of the micro-engines of the system components. The NIM also contains the synchronization circuitry to control the data transfers.

To each of the micro-engines, data is transmitted and received via an addressable dynamic register. Data is written into and read from the dynamic register under control of the micro-engine clock as with any of its directly addressable registers. Thus data can be written and read by a micro-engine as rapidly as any other data transfer within the micro-engine.

The NIM is responsible for controlling all of the data transfers. Thus the primary synchronization circuitry is found within the NIM. Instead of permitting communication among all of the system components, the interface is point-to-point between each of the components and the NIM. Therefore, any communications is accomplished by transfer from a component to the NIM followed by a transfer from the NIM to the second component. However, the overall speed of even a two step transfer is a significant improvement over the prior art.

A further advantage of requiring all transfers to be to and from the NIM is an improvement in the coordination of the transmissions. Thus failures within a given component are not easily propagated from one component to another, because the NIM is in a position to "sanitize" any such errant messages. Failure control is also greatly enhanced by the speed of the interface. This provides the NIM with the basic capability to monitor failure status, disable failing components, and reconfigure the system in rapid fashion.

Though the primary advantage of the present invention is to provide an extremely fast and efficient intercomponent interface for system monitoring, failure analysis, reconfiguration, and maintenance, operational data may also be transferred over the interface. Potential candidates for such operational message traffic include high volume signal processing, real time mode switching, and the assignment of very high priority to certain tasks.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
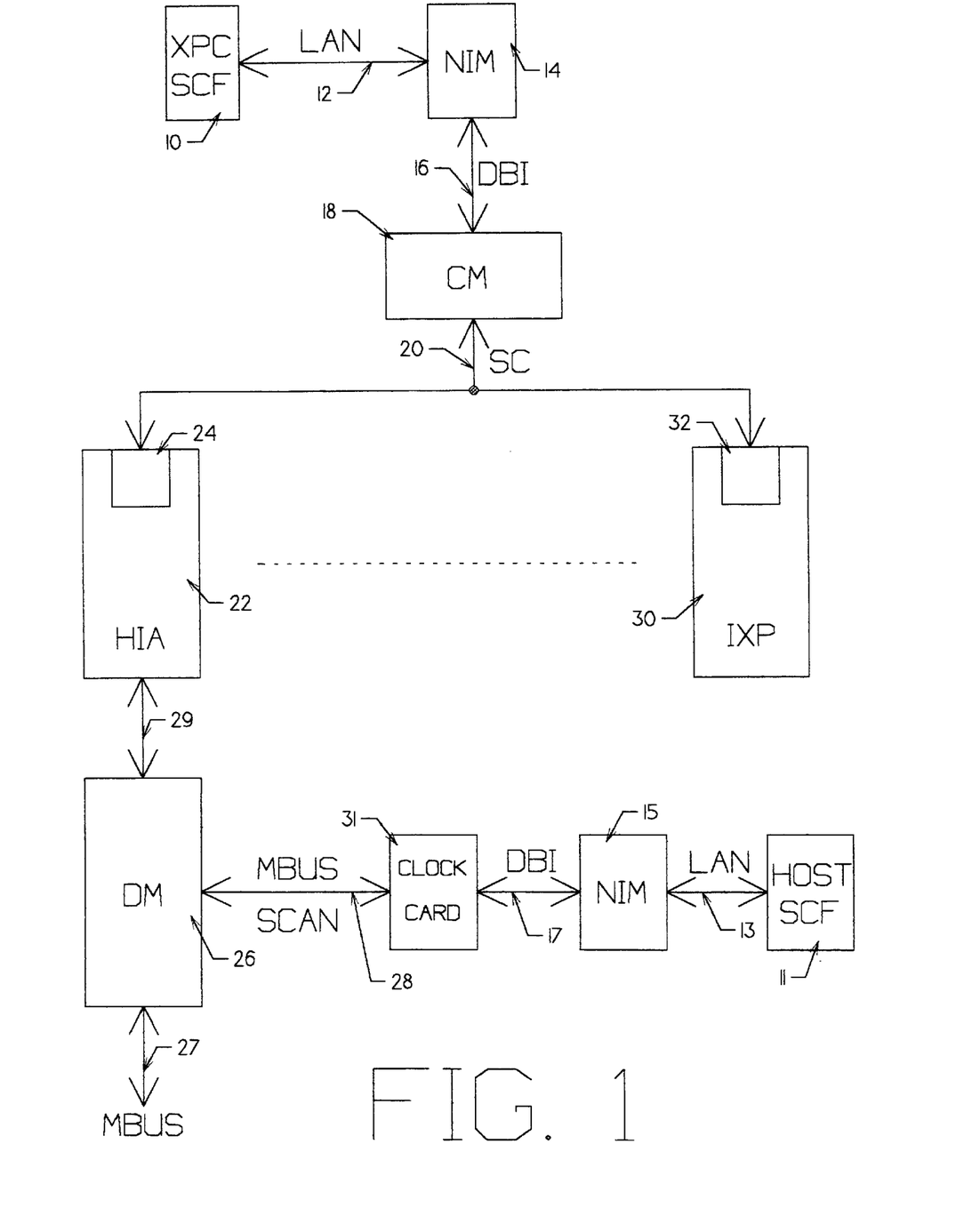
FIG. 1 is an overall block diagram of the preferred mode of the present invention.

FIG. 1 is an overall block diagram of a data processing system employing the preferred mode of the present invention. The highest level system control is provided by the System Control Facilities (SCF's). Host SCF 11 provides the highest level of control for the host computer complex whereas XPC SCF 10 provides a similar function for the extended processing complex (XPC). In the preferred embodiment and not to be deemed as limiting of the present invention, SCF 10 and SCF 11 are industry standard personal computers programmed to provide the desired functions as taught in U.S. patent application Ser. No. 08/000, 290 filed Jan. 4, 1993, incorporated herein by reference.

XPC SCF 10 communicates with Network Interface Module (NIM) 14 via Local Area Network (LAN) 12. As explained in the above referenced commonly assigned co-pending U.S. patent application, XPC SCF 10 may also control various other systems as well via local area network 12. Similarly, Host SCF 11 communicates with NIM 15 via LAN 13.

NIM 14 communicates with the various system components of the XPC using Diagnostic Bus Interface (i.e. DBI) 16. DBI 16 is a bi-directional parallel data bus for the passage of the data transferred by the preferred mode of the present invention, along with the needed control signals as discussed in more detail below. Clock Maintenance module (i.e. CM) 18 fans out the signals from DBI 16 to each of the system components via Scan Control 20. NIM 15 communicates with clock card 31 via DBI 17 in like fashion.

The data and control interface terminates at micro-engines 24 and 32 which provide hardware control for representative system components Host Interface Adapter (HIA) 22 and Index Transaction Processor (IXP) 30, respectively. These components of the XPC system are assumed to be representative and not limiting of the present invention. The internal operation and functions of each of these system modules is not important for the operation of the present invention in that each employs a similar micro-engine to which the interface is established. HIA 22 interfaces with the Data Mover (DM) module 26 via interface 29 from which data is moved to and from the memory bus via interface 27. DM 26 is also controlled and monitored via Memory Bus (MBUS) scan interface 28.

Figure 2:
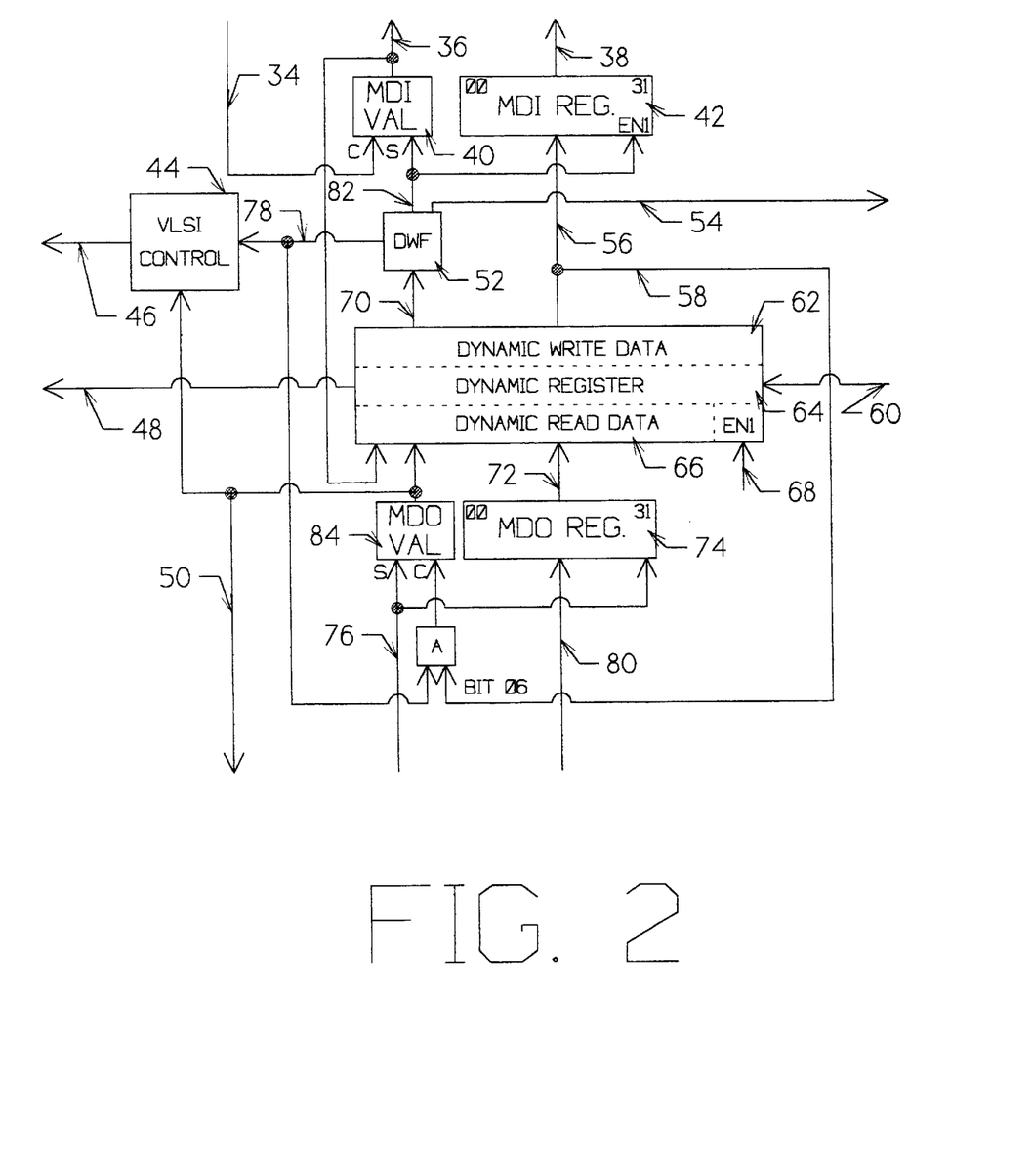
FIG. 2 is a schematic diagram showing the dynamic register.

FIG. 2 is a block diagram of the data transfer hardware located within the micro-engines of Data Mover 26 and Index Processor 30. The heart of the data interface circuitry is dynamic register 64, which is a data register for 32 bit parallel words. Interface 60 is the input path from network interface module 14 (see also FIG. 1) and interface 48 provides the output path to NIM 14. Data words may be thus directly written into and read from dynamic register 64 by NIM 14.

Dynamic write data register 62 stages data being transferred from NIM 14 to the micro-engine for transfer to Micro-engine Data In (i.e. MDI) register 42 via line 56. As soon as enabled into MDI register 42 by an enable signal on line 82, the 32 bit word becomes available to the associated micro-engine via line 38. The enable signal is generated by Dynamic Write Function (DWF) circuit 52 based upon the predetermined states of bit positions 00–03 (i.e. the four least significant bit positions) received from dynamic write register 62 via line 70. The same enable signal is used to set MDI validity flip-flop 40, which indicates to the micro-engine via line 36 that MDI register 42 contains valid data. After the micro-engine has processed the message, it clears the MDI validity flip-flop 40 via line 34. Other predetermined four bit patterns may be utilized by dynamic write function circuit 52 to generate other control signals for transfer via line 54.

Words to be transferred from the micro engine to NIM 14 are input to MDO register 74 via line 80 and enabled by a control signal on line 76. This same signal, generated by the micro-engine, sets MDO validity flip-flop 84 to indicate the validity of the data in MDO register 74 to VLSI control 44, dynamic read register 66, and the micro-engine. The data is transferred to dynamic read register 66 via line 72 when enabled by the signal on line 68. From dynamic read register 66, the data word is staged for entry into dynamic register 64, whereupon it becomes available to NIM 14 via line 48.

MDO validity flip-flop 84 is cleared by anding of bit position 06, received via line 58, and the rearm function signal received via line 78. This rearm function signal is generated by dynamic write function circuit 52 which enables VLSI control 44 to generate an input request of NIM 14 via line 46. It is this function which synchronizes input data to NIM 14.

Figure 3:
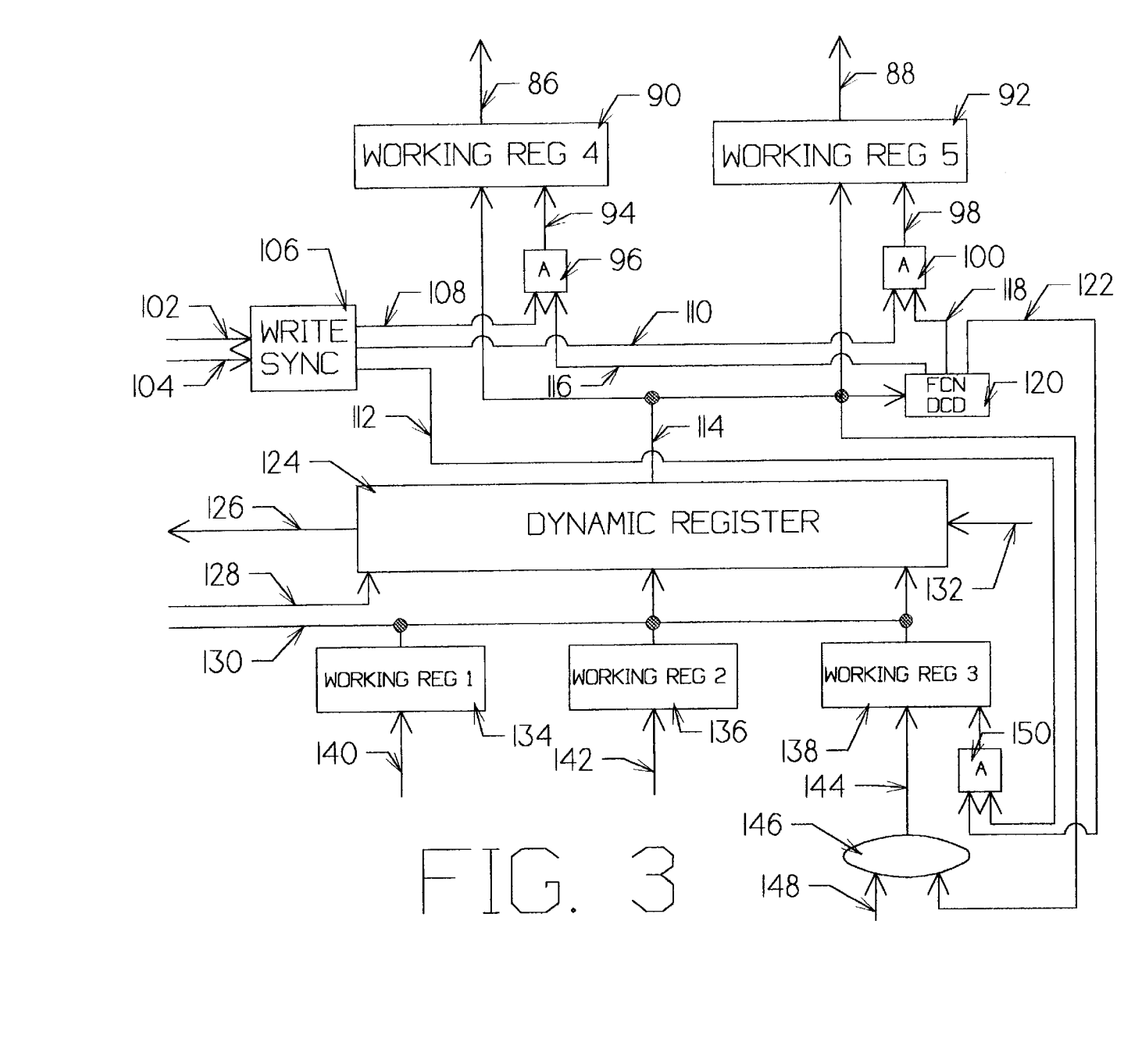
FIG. 3 is a block diagram showing the various inputs and outputs of the dynamic register.

FIG. 3 is a more conceptualized pictorial view showing the method of interface of dynamic scan with static working registers. It is the intent to show herein the functional relationship of the elements rather than the strictly hardware relationships shown in example described in FIG. 2. In this manner, the use of the preferred mode of the present invention may be readily appreciated.

Dynamic register 124 functions as previously discussed (see also FIG. 2) with input from and output to NIM 14 via lines 132 and 126, respectively. Dynamic register 124 is clocked by the input received via line 128.

Typical inputs to dynamic register 124 from the associated micro-engine are via working registers 1, 2, and 3 (134, 136, and 138). These working registers are representative of some typical inputs which are application dependent.

Therefore, this example is not to be deemed limiting of the present invention. Working register 134 stages service request master bits received from the micro-engine via line 140 for transfer to dynamic register 124 via bus 130. Similarly, passive fault indicators are received via line 142 and staged by working register 136.

Working register 138 represents a staging register for general data transfers. It receives data via line 144 from selector 146, which selects from micro-engine generated data on line 148 or the data on bus 114 from dynamic register 124. Data is enabled into working register 138 by the output of and-gate 150. The enables to and-gate 150 are generated by the output of dynamic write synchronizer 106 via line 112 and from function decoder 120 and line 122.

Dynamic write synchronizer 106 is controlled by NIM 14 via lines 102 and 104 to provide the enable signals placed on lines 112, 110, and 108. As explained above, the signal placed on line 112 generates the enable for working register 138 via and-gate 150, whereas the signals placed on lines 108 and 110 perform the same function for working registers 90 and 92 via and-gates 96 and 100, respectively. The synchronizer thus synchronizes the VLSI functional clock and scan operation (i.e. scan clocks).

In operation, working registers 90 and 92 stage data transfers from dynamic register 124 to the associated micro-engine via lines 86 and 88, respectively. Working register 90 is typically for general data messages, and working register 92 is for fault indication messages. And-gates 96 and 100 are also enabled by the signals placed by function decoder 120 on lines 116 and 118, respectively.

Figure 4:
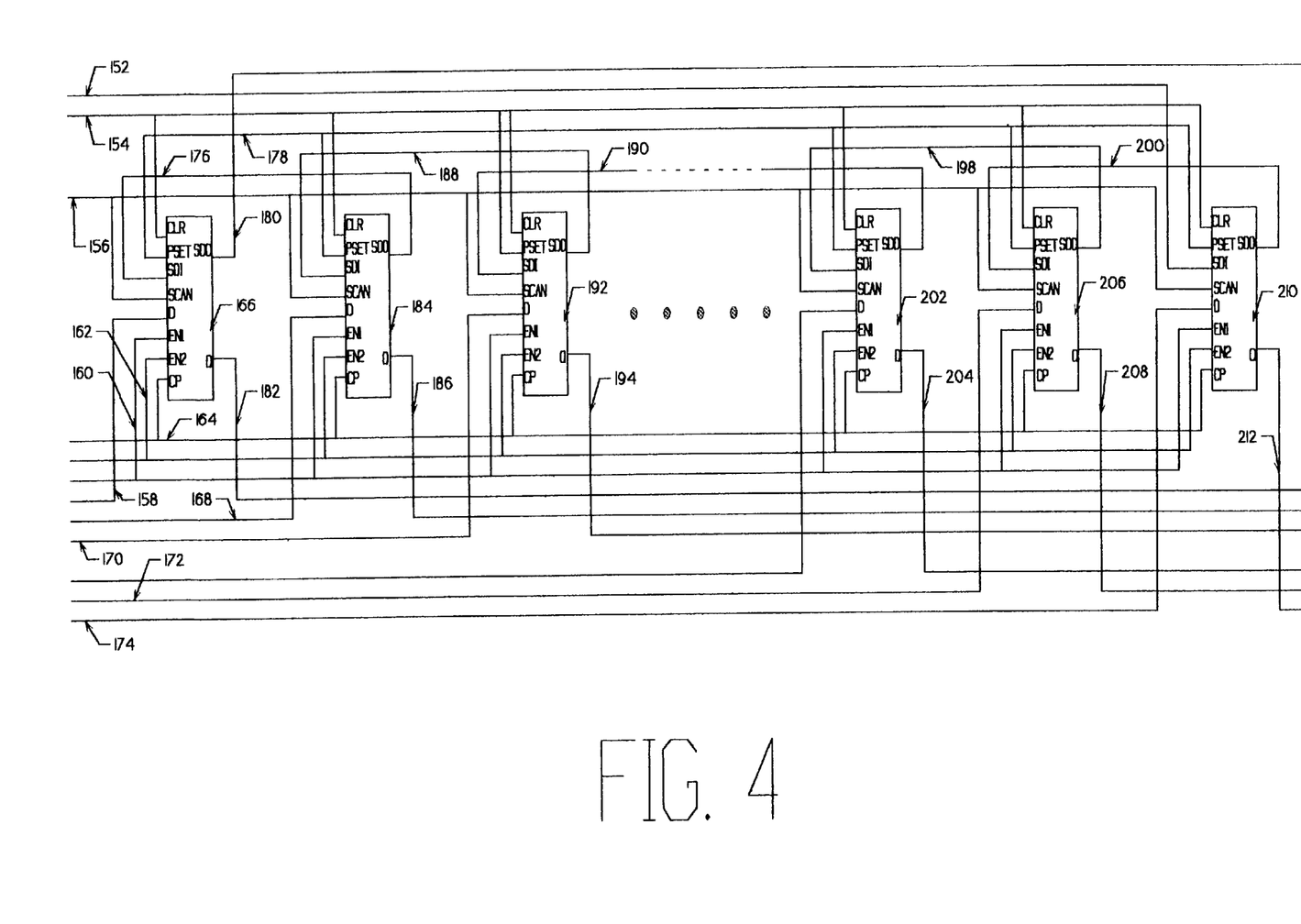
FIG. 4 is a detailed schematic diagram of the dynamic register;.

FIG. 4 is a detailed schematic diagram of the hardware of the dynamic register. It is comprised of 4 bit positions of functional information and 32 bits of data wherein each bit position contains a staged data flip-flop as represented by flip-flops 166, 184, 192, . . . , 202, 206, and 210. The 32 data input bit lines are 158, 168, 170, . . . , 171, 172, and 174. Similarly, the data output lines are 182, 186, 194, . . . , 204, 208, and 212. The length of the dynamic scan register is independent of the function of the VLSI device.

All of the stages of the dynamic register are clocked by the main clock signal on line 164. The same signal is presented after an appropriate delay on line 162 as an enable to each flip-flop of the dynamic register. The enable signal presented on line 160 is the register load signal.

The entire dynamic register may be cleared by a clear signal on line 154. A scan signal on line 156 provides the opportunity to scan the contents of the dynamic register. Similarly, a test signal on line 178 enables testing of each stage of the dynamic register. This signal is used in conjunction with the clear signal to "clear" or "preset". Lines 176, 180, 188, 190, 198, and 200 provide opportunity to bit serial scan the lines allowing bit shifting in the scan string.

Figure 5:
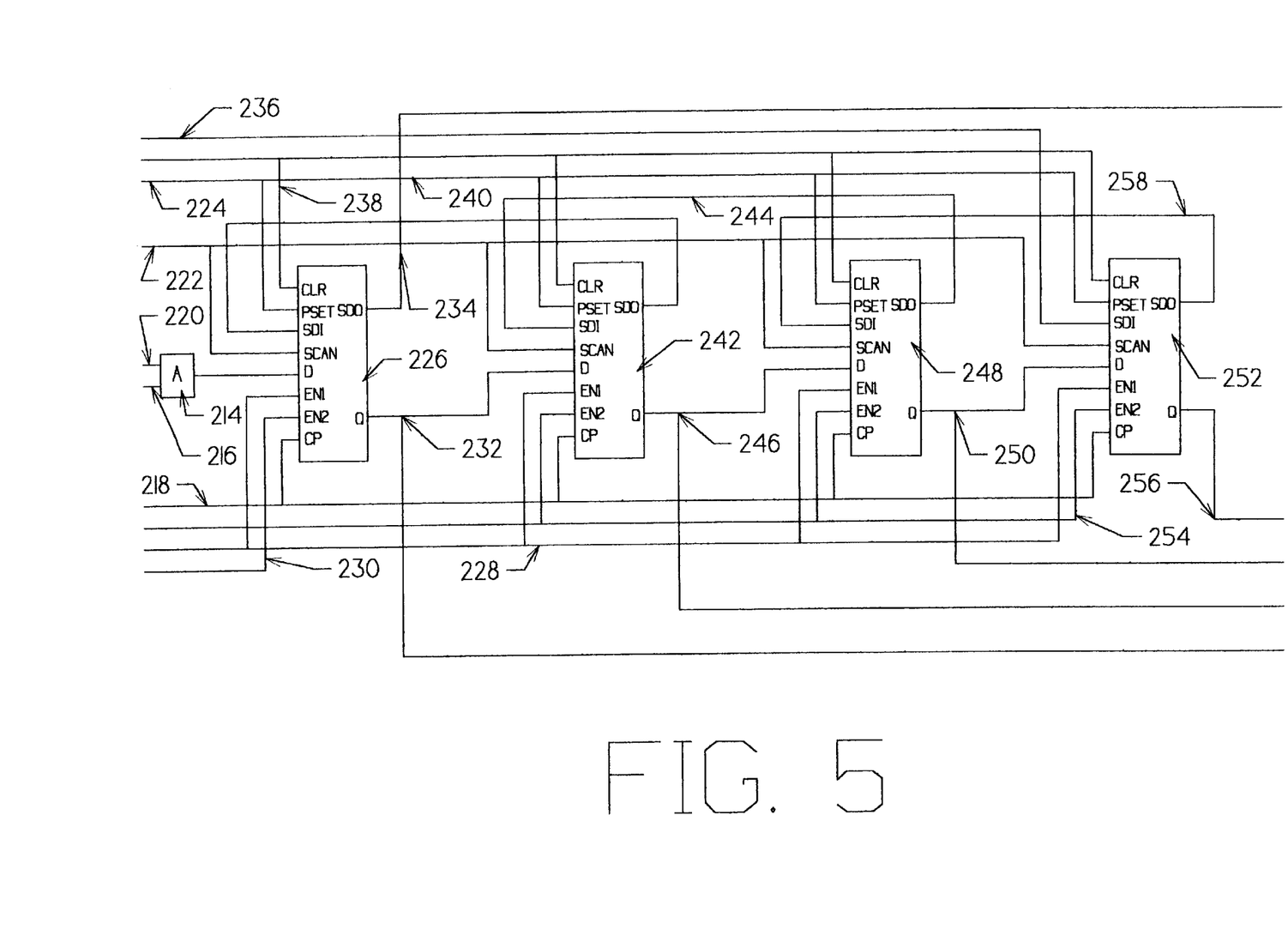
FIG. 5 is a detailed schematic diagram of the write synchronizer.

FIG. 5 is a detailed schematic diagram of the dynamic write synchronizer (see also FIG. 3). This circuit is necessary to control and sequence data exchanges between the dynamic register and the working registers. Each of the primary outputs on lines 232, 246, 250, and 256 provides the enable signal for a different one of the working registers shown in FIG. 3. The selection is dependent upon the clock enable of the working register. The circuit consists primarily of four staged data flip-flops 226, 242, 248, and 252 coupled to sequence the desired data transfers.

The circuit is clocked by line 218. The delayed clock signal provides the enable-2 signal via line 254 to flip-flops 242, 248, and 252. The enable-2 signal is transferred to flip-flop 226 via line 230. All four flip-flops receive an enable-1 signal via line 228.

The four flip-flops are cascaded with the Q output of flip-flop 226 providing the D input to flip-flop 242 via line 246. Similarly, lines 246, and 250 provide the Q outputs of flip-flops 242 and 248 to the D inputs of flip-flops 248 and 252, respectively. The D input of flip-flop 226 is provided as the output of and-gate 214, which is the combination of the load signal from line 220 and the timing signal from line 216.

The entire timing chain is cleared from line 238. Similarly, all stages can be set by a signal on line 224. The scan signal is supplied via line 222. Lines 243, 244, and 258 provide feed back from each flip-flop to the immediately preceding flip-flop in the timing chain. The feed back output signal of flip-flop 226 is provided as the output on line 234.

Figure 6:
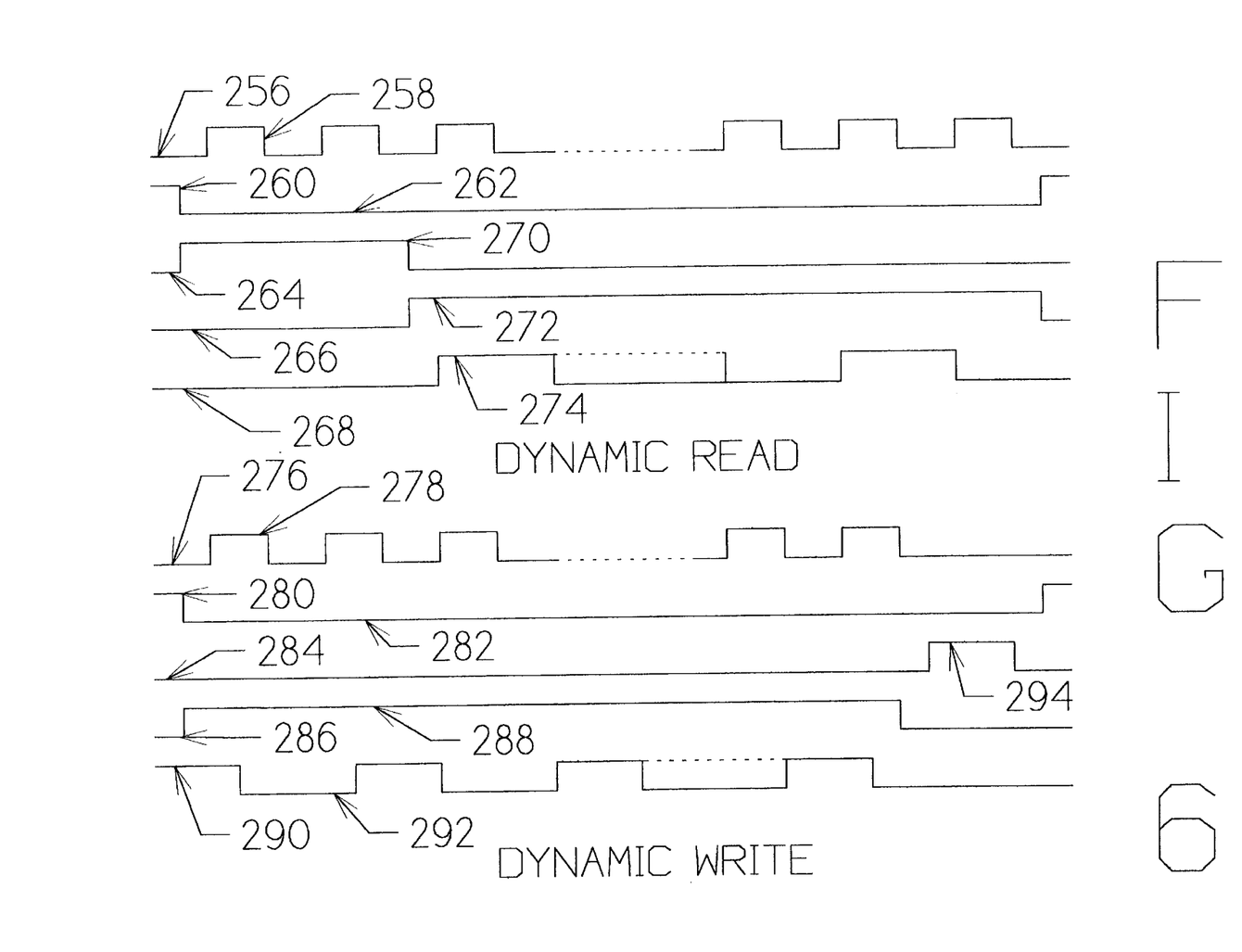
FIG. 6 is a timing diagram of the single transfer scanning operates.

FIG. 6 is an overall timing diagram for single word reads and writes to the dynamic register. Lines 256 and 276, comprising trains of pulses 258 and 278, provide the basic clock signal. Timing signals 262 and 282 for synchronization of the write synchronizer are shown on lines 260 and 280. These signals are impressed on line 216 (see also FIG. 5) to enable and-gate 214.

For the read operation, line 264, having signal 270, provides the dynamic register load signal, which is placed on line 160 (see also FIG. 4) to enable loading of the dynamic register. Line 266 shows the period of activity during the reading of the dynamic register as pulse 272. The data output is shown on line 268 as pulse(s) 274. The signal is conveyed via line 126 (see also FIG. 3).

For the dynamic write operation, line 284, containing pulse 294, the dynamic write signal via line 220 (see also FIG. 5) to enable and-gate 214 and initiate the timing chain of the write synchronizer. Line 286 shows activity during the dynamic write operation via pulse 288. The data in signals are shown as pulse(s) 290 on line 292. Referring again to FIG. 3 shows the data in signals on line 132 as input to dynamic register 124.

Figure 7:
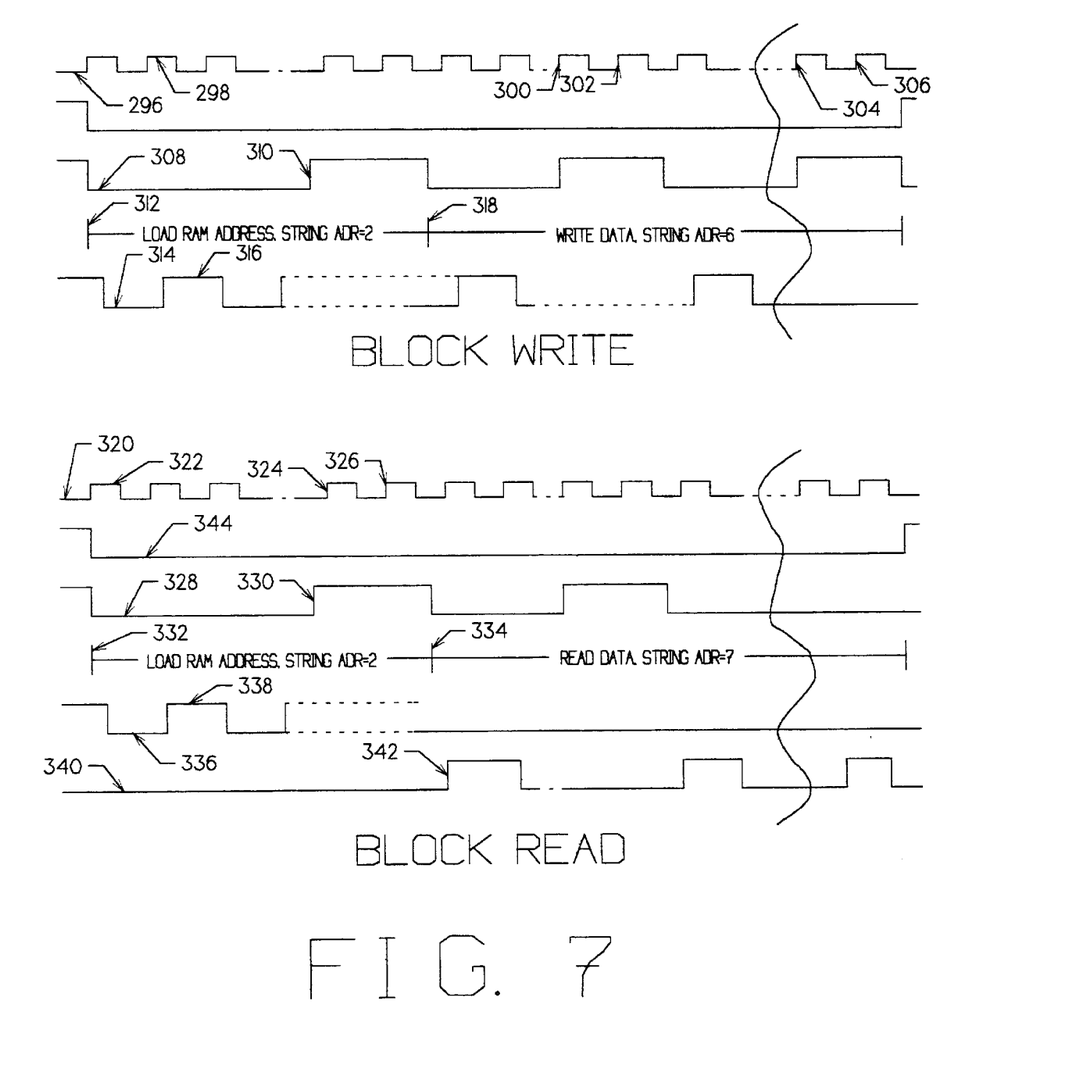
FIG. 7 is a timing diagram of the block transfer scanning operations.

FIG. 7 provides similar timing diagrams for block read and block write operations. These are provided primarily to illustrate the detailed operation of the preferred application of the present invention. The clock signals are repeated on lines 296 and 320 as pulse trains 298 and 322, respectively. Similarly, the write synchronizer synchronizing signal is shown on lines 297 and 344. This signal is impressed on line 216 (see also FIG. 5).

For the block write operation, lines 308 and 312 containing pulse trains 310 and 318, respectively, show control of the memory addressing and data enable circuitry. The data input signal is shown on line 314 containing pulses 316. This signal is presented on hardware line 132 (see also FIG. 3).

During the process of writing a block, point 300 indicates the beginning of writing of the first word. The address is incremented at point 302 in preparation for storing the second word. Points 304 and 306 indicate storing of the nth word and the nth iteration, respectively.

The control signals for block reading of data are shown as pulses 330 on line 328, pulses 334 on line 332, pulses 338 on line 336, and pulses 342 on line 340. Pulses 342 of line 340 are impressed on hardware line 132 (see also FIG. 3). Point 324 indicates the time at the beginning of reading word 1. The read address is incremented at point 326.

Figure 8:
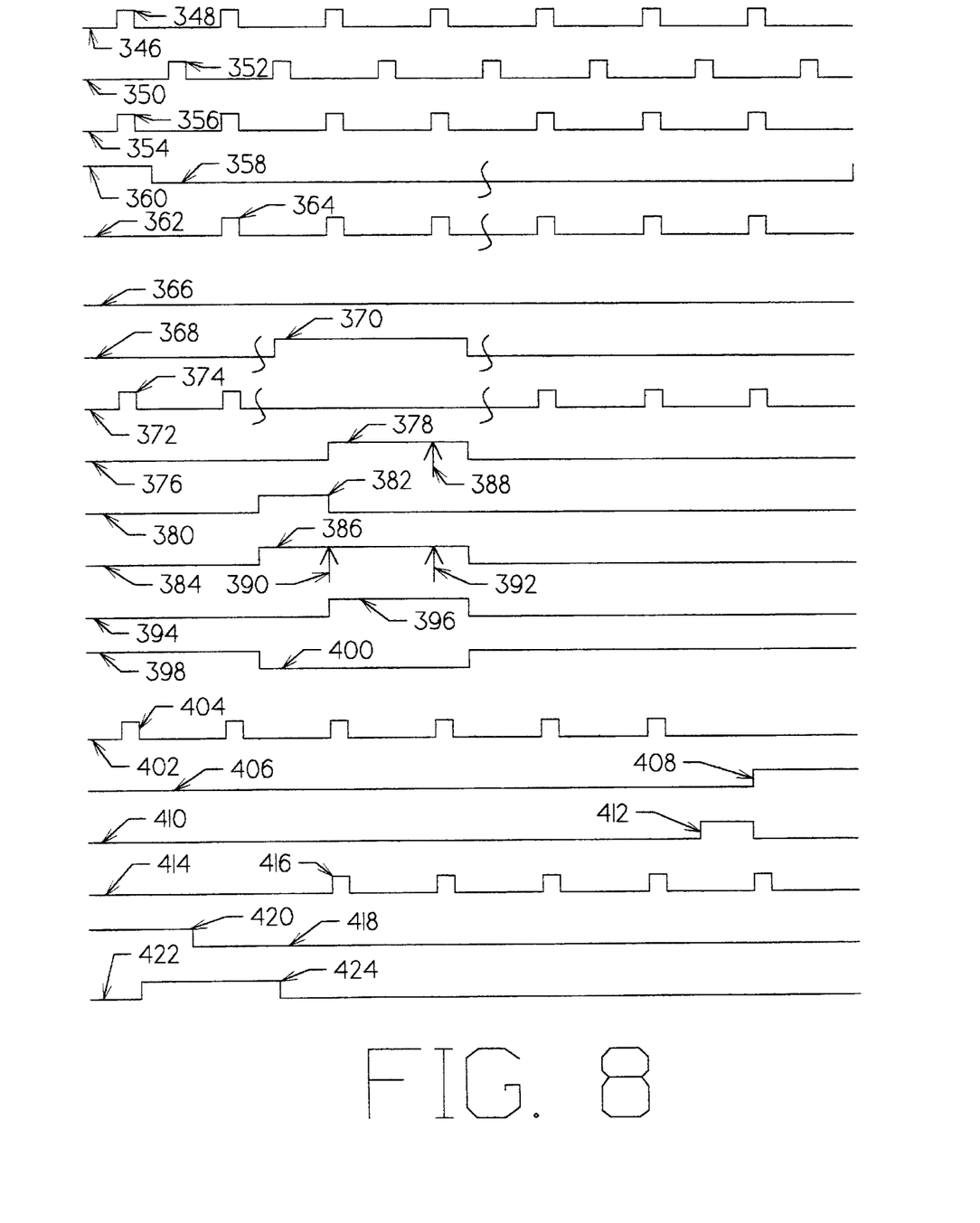
FIG. 8 is a detailed timing diagram of the various transfer modes.

FIG. 8 is a timing diagram of the scan control signals from NIM 14 for single and block reads and writes (See also FIG. 2). Lines 346, 350, and 354 containing pulses 348, 352, and 356, respectively, are the clock signals for controlling all of the other control timing. Line 346 presents the master bus clock signal. Line 350 has the master bus clock signal as delayed to be shifted in phase about 180 degrees. The scan clock, which is slaved to the master bus clock, is shown on line 354.

For normal operations, a single word is read or written. Line 358 shows the scan chip selection pulse 360. The internal scan clock, which is slaved to the master bus clock, is shown as pulse train 364 on line 362.

In the block mode, multiple words are read or written. The chip select signal is presented on line 366, which is not toggled for block operations. Block mode update signal 370 is shown on line 368. Line 372, containing pulse train 374, is the internal scan clock, which is slaved to the master bus clock. Pulse 378 on line 376 updates the address counter. Point 388 illustrates the time at which the address counter has stabilized.

Line 380 containing pulse 382 provides the memory write for block write operations. Pulse 400 of line 398 shows the availability of the write data. Line 384, containing pulse 386, shows the load memory signal for the block read operation. Pulse 396 of line 394 is the signal which toggles the control flip-flop.

Timing for the dynamic scan write is shown by lines 402, 406, and 410. Pulse train 404 is the internal scan clock, which is slaved to the master bus clock. The dynamic scan write chip select is performed by pulse 408. Pulse 412 provides the dynamic scan write update.

Lines 414, 418, and 422 show the key timing for dynamic scan read operations. Pulse train 416 is the internal scan clock. The dynamic load function occurs in response to pulse 424.

Figure 9:
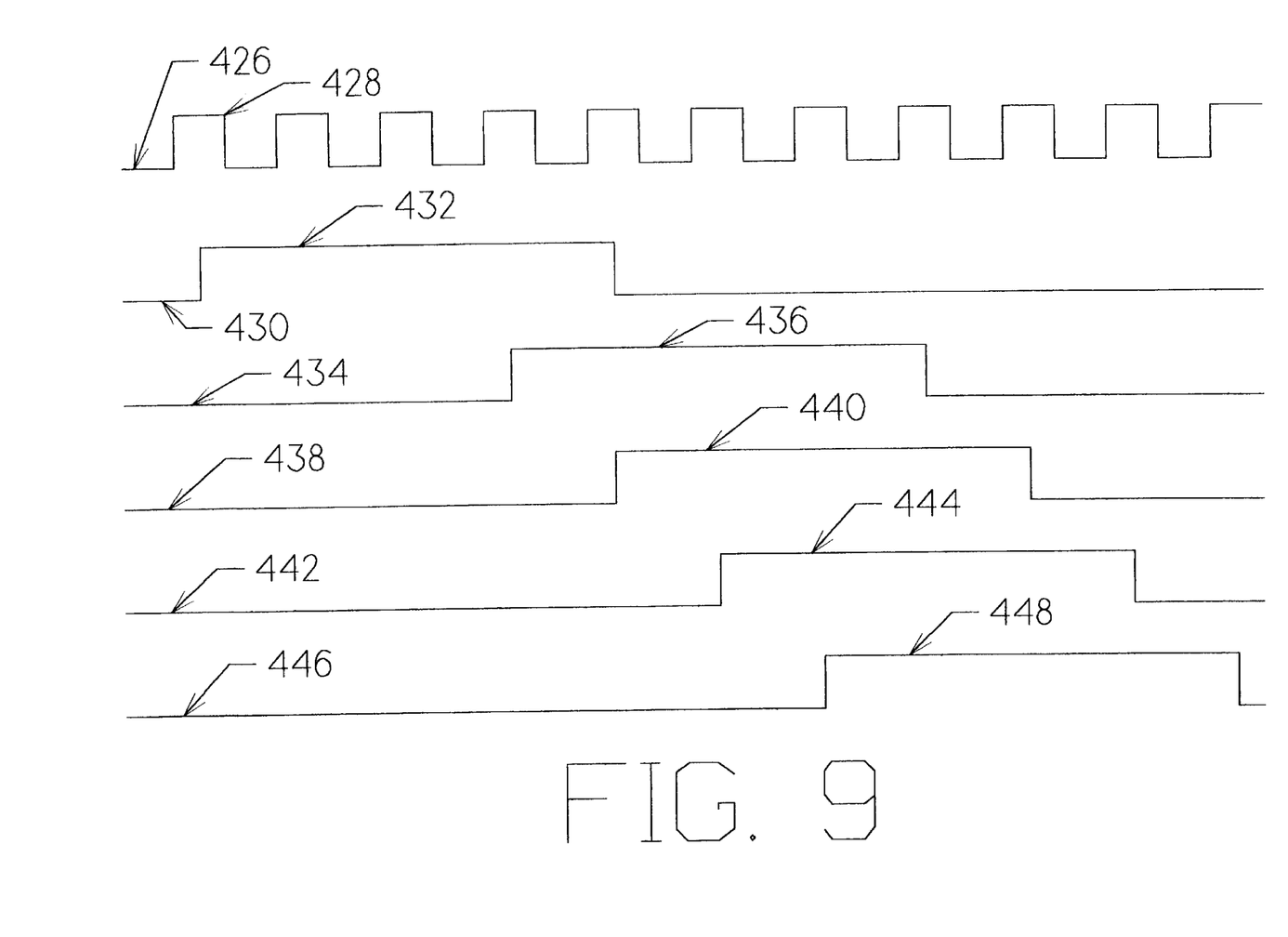
FIG. 9 is a timing diagram for operation of the write synchronizer.

FIG. 9 is a timing diagram for write synchronizer 106 (see also FIG. 3), which is shown in detail in FIG. 5. Line 426, containing pulse train 428, shows the clock signal. The write synchronizer timing chain is initiated by the dynamic write signal pulse 432 of line 430. This signal is impressed upon hardware line 220 (see also FIG. 5).

The timing chain outputs are pulses 436, 440, 444, and 448 of lines 434, 438, 442, and 446, respectively. These output signals correspond to the outputs of the write synchronizer found on lines 232, 246, 250, and 256, respectively. The generation of these signals can be seen on FIG. 5.

Figure 10:
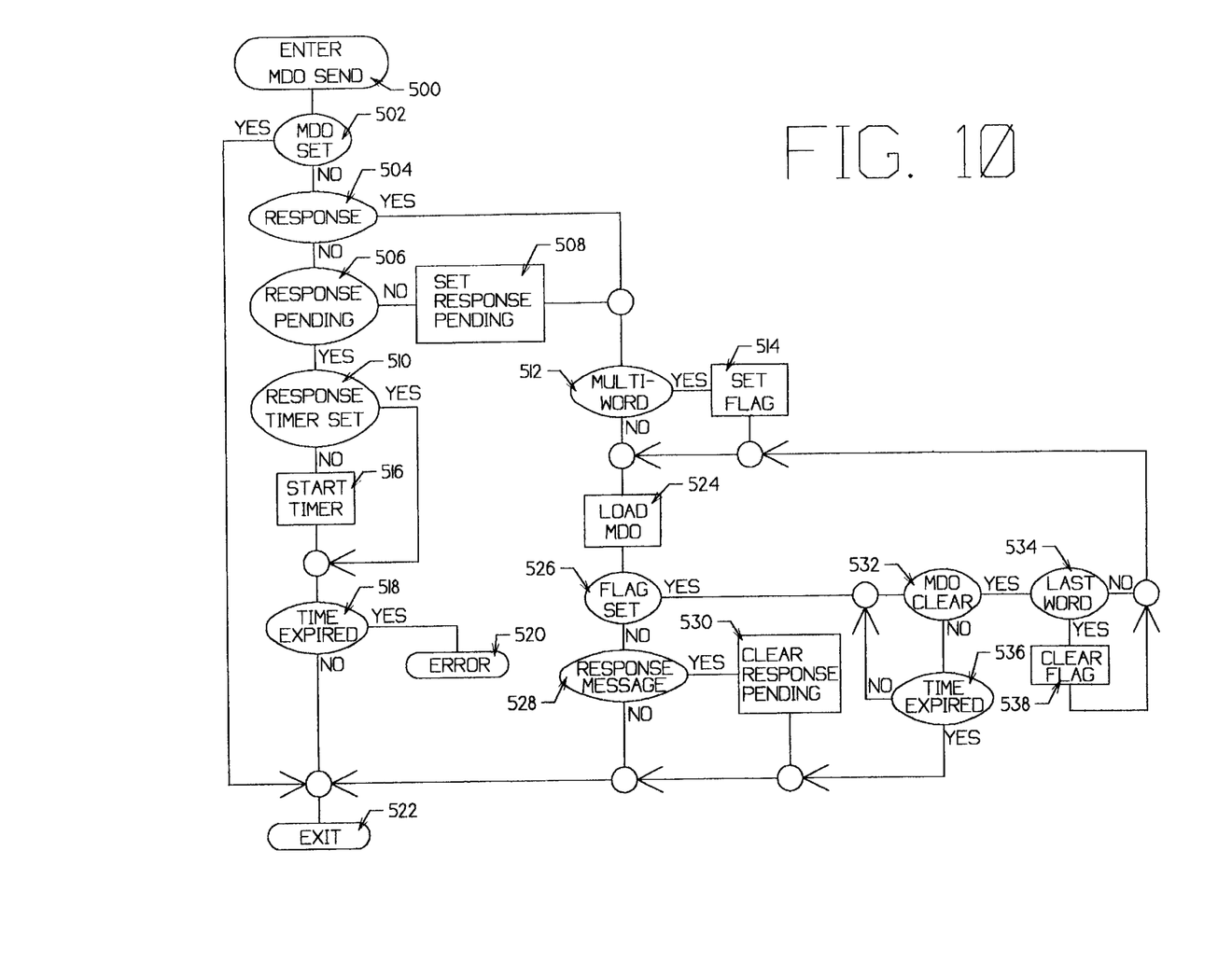
FIG. 10 is a flow chart for an MDO transfer.

FIG. 10 is a flowchart of the transfer of data from one of the micro-engines to NIM 14 (see also FIG. 1). The procedure is entered at element 500. Element 502 determines whether the micro-engine has a pending request to NIM 14 which has not yet been satisfied. If yes, control is given to element 522 to exit the procedure until the previous request has been processed.

If no previous request is pending, element 504 determines whether a response message has been received. If yes, control is given to element 512 for processing the response message. If no, control is given to element 506 to determine whether any other response is pending. If not, element 508 sets the response pending flag and gives control to element 512 for further processing.

If a response is pending but not yet received, element 510 determines if the response timer has been set. This step is necessary, because a request is not timed out for lack of a response unless another pending request is queued for transfer to NIM 14. Element 516 starts the timer. The 200 microsecond clock time (i.e. timeout) is determined by element 518. If the time has not expired, element 522 presents the normal exit to await the arrival of the response from NIM 14. After expiration of the 200 microsecond timeout, element 520 provides an error exit, which is processed in accordance with FIG. 12 and the description below.

Processing of the response as received proceeds at element 512, which determines whether the response contains multiple words. If yes, element 514 sets the multiple word flag. Element 524 loads the next word for output. The multiple word flag (set by element 514) is queried at element 526. If the flag is clear, the transfer is complete. If element 528 determines a response message, element 530 clears the response pending flag. Control is given to the normal exit at element 522.

For multiple word transfers, element 532 determines whether the transfer path is clear. If not, element 536 determines if 50 microseconds have elapsed. If yes, exit is via element 522. If no, control is returned to element 532 to await clearing of the transfer path. When the transfer path is cleared, element 534 determines if the last word has been transferred. If not, control is given to element 524 for loading of the next word of the multiple word transfer. Whenever the last word is to be loaded, element 538 clears the multiple word transfer flag.

Figure 11:
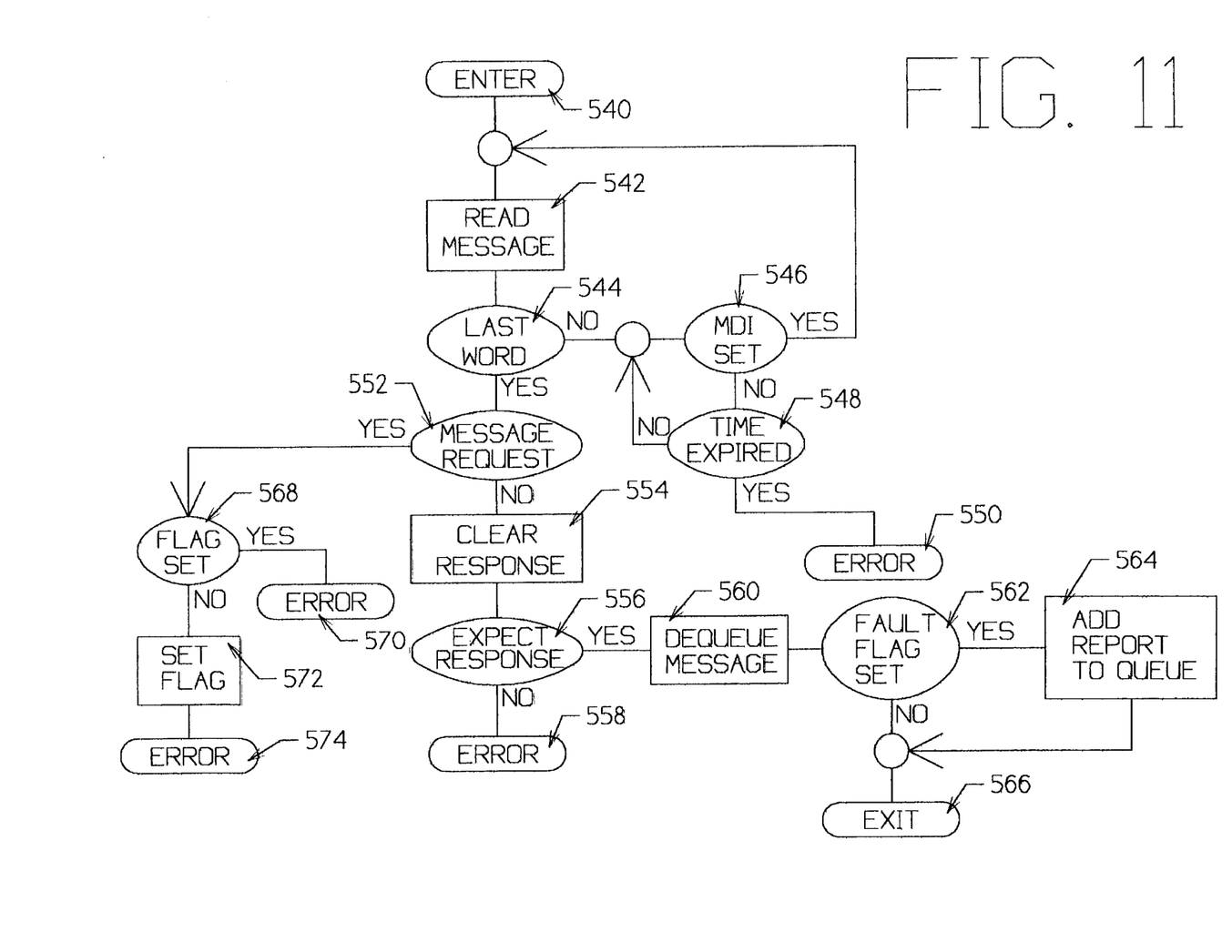
FIG. 11 is a flow chart for an MDI transfer.

FIG. 11 is a flow chart showing receipt of a data transfer from NIM 14 to one of the micro-engines (see also FIG. 1). Entry is via element 540, as a result of a dispatcher branch from a set input flag. Element 542 reads the first (or next) word from the input register. A determination of the last word is made at element 544. If yes, the message end processing is accomplished being with element 552. If the last word has not yet been received, element 546 determines whether the input flag has been set again indicating that the next word has been received. If not, element 548 determines awaits the 50 microsecond clock. If not, the next word is awaited. If yes, element 550 provides an error exit which is described in greater detail below.

After the complete message has been received, element 552 determines whether this is a message request. If yes, element 568 determines whether the request input pending flag is set. If yes, the error exit at element 570 is used indicating that there is an extra request error. The processing of this error is discussed in greater detail below. If not, element 572 sets the request input pending flag and exits at element 574 to process the error message. Processing of the message is completely dependent upon system definition, which is not pertinent to the subject matter of the present invention.

If element 552 determines that the transfer was not a message request, control is given to element 554 to clear the flags for pending response and response timer. Element 556 determines whether the response was expected. If no, error exit is via element 558, which is described in greater detail below. If the response was expected, control is given to element 560 for dequeueing of the message. Element 562 determines whether the fault lost flag is set. If yes, element 564 adds a lost fault report to the message queue. Normal exit at element 566 returns control to the micro-engine dispatcher.

Figure 12:
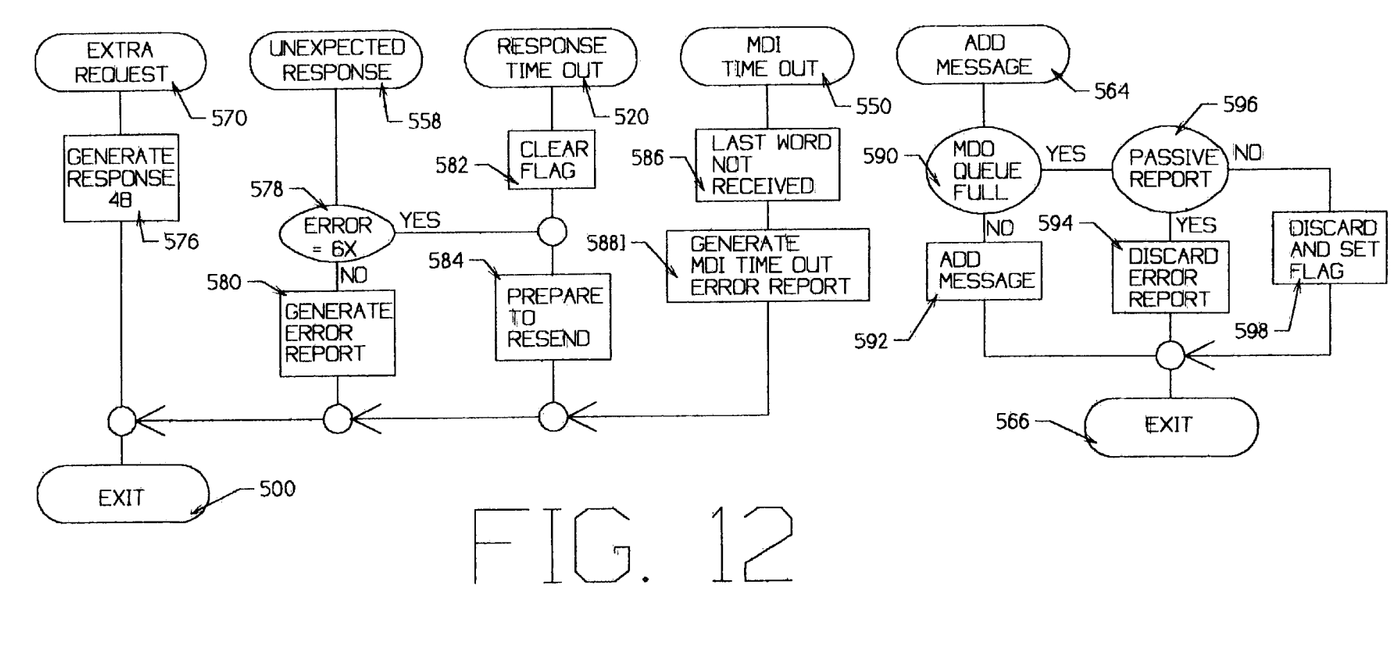
FIG. 12 is a flow chart for processing the various error indications.

FIG. 12 is a flow chart showing the processing of the various exits of the input and output procedures. Element 570 initiates the extra request error routine (see also FIG. 11). The error status=48 is generated to indicate an unexpected extra request in message. Exit to the output routine (see also FIG. 10) is via element 500.

An unexpected response (see also FIG. 11) results in entry at element 558. Element 578 determines whether the error status is 6X. If no, element 580 simply generates an error report. If yes, element 584 prepares to resend message. The resend message is also prepared by element 584 after clearing of the timing flag by element 582, whenever entry is made via response time out at element 520. In each case, exit is via element 500.

Element 550 results from an input time out condition (see also FIG. 11). That the message is incomplete is flagged by element 586 indicating that the last word has not yet been received. The error report is prepared by element 588, and exit is via element 500.

The procedure for adding an error report to the message queue (see also FIG. 11) is entered at element 564. Element 590 determines whether the queue is full. If not, the message is added and exit is via element 566. If the message queue is full, element 596 determines whether the report is passive. If yes, the report is discarded, and exit is via element 566. If no, a special flag is set indicating the loss of a message before the error report is discarded.

Having thus described the preferred embodiments of the present invention, those of skill in the art will readily appreciate that yet other embodiments may be made and used within the scope of the claims hereto attached.

I claim:

1. In a digital data processing system having a system element embedded in a parallel processing architecture, an apparatus comprising:
   a. a micro-engine for controlling said system element;
   b. a register located within and directly addressable by said micro-engine; and
   c. a network interface module, having a point-to-point interface, which is timed asynchronously with respect to said micro-engine and which is coupled to said register through said point-to-point interface whereby said network interface module writes into and reads from said register through said point-to-point interface.

2. An apparatus according to claim 1 further comprising:
   a. a second micro-engine for controlling a second system element; and
   b. a second register located within and directly addressable by said second micro-engine and coupled to said network interface module whereby said network interface module writes into and reads from said second register.

3. An apparatus according to claim 1 wherein said register is a dynamic register.

4. An apparatus according to claim 2 wherein said second register is a dynamic register.

5. A method of communicating between a first system element and a second micro-engine controlled system element, wherein said first system element is timed asynchronously with respect to said second micro-engine controlled system element, comprising:
   a. writing data from said first system element into a register located within said second micro-engine controlled system element; and
   b. reading said data from said register by said second micro-engine controlled system element.

6. A method of communicating between a first system element and a second micro-engine controlled system element, wherein said first system element is timed asynchronously of said second micro-engine controlled system element, comprising;
   a. writing data into a register within said second micro-engine controlled system element by said second system element; and
   b. reading said data from said register by said first system element.

7. In a digital data element and system employing a first system element and a second system element and wherein said first system element is controlled by a micro-engine and wherein said first system element is timed asynchronously with respect to said second system element, the improvement comprising:
   a. a dynamic register located within said second system element; and
   b. an interface between said first system element and said dynamic register whereby said first system element writes into and reads from said dynamic register.

8. The improvement of claim 7 wherein said second system element is coupled to said dynamic register whereby said second system element writes into and reads from said dynamic register.

9. The improvement of claim 8 wherein said dynamic register accommodates a plurality of bit positions in parallel.

10. The improvement of claim 9 wherein said interface accommodates said plurality of bit positions in parallel.

11. A method of communicating a micro-engine controlled system element having an addressable register, and a system element, wherein said system element operates asynchronously with respect to said micro-engine controlled system element, comprising:
    a. writing data from the micro-engine controlled system element into the register; and
    b. asynchronously reading said data from the register by the system element.

* * * * *